United States Patent [19]

Wojtowicz et al.

[11] 3,894,018

[45] July 8, 1975

[54] DICHLOROISOCYANURIC ACID PRODUCTION

[75] Inventors: John A. Wojtowicz, Cheshire; William C. Herms, Meriden, both of Conn.

[73] Assignee: Olin Corporation, New Haven, Conn.

[22] Filed: Sept. 4, 1974

[21] Appl. No.: 503,203

[52] U.S. Cl............................................. 260/248 C
[51] Int. Cl............................................. C07d 55/40
[58] Field of Search ............................... 260/248 C

[56] References Cited
UNITED STATES PATENTS 3,415,823   12/1968   Moore et al. ..................... 260/248

*Primary Examiner*—John M. Ford
*Attorney, Agent, or Firm*—James B. Haglind; Donald F. Clements; Thomas P. O'Day

[57] ABSTRACT

A process is described for preparing dichloroisocyanuric acid by mixing water with trichloroisocyanuric acid having a particle size of less than about 60 microns and heating the resulting mixture to a temperature above about 90°C.

In a preferred embodiment sufficient water is used to form a slurry, which upon agitation, causes the formation of a viscous slurry of trichloroisocyanuric acid. Excess water is separated and the resulting wet cake is heated to form dichloroisocyanuric acid.

In another embodiment, granular particles of trichloroisocyanuric acid are admixed with an aqueous solution containing from about 10 to about 26 percent by weight of an alkali metal chloride. Agitation of the granular particles in this solution changes the crystalline structure of the solid particles, and a viscous slurry of trichloroisocyanuric acid is formed. Excess alkali metal chloride solution is separated and the resulting wet cake is washed to remove any alkali metal salt to reduce the concentration of alkali metal chloride to below about 0.1 mol. per mol of trichloroisocyanuric acid. The resulting wet washed particles are heated to a temperature above about 90°C. to form dichloroisocyanuric acid.

15 Claims, No Drawings

DICHLOROISOCYANURIC ACID PRODUCTION

This invention relates to a process for the production of dichloroisocyanuric acid. Dichloroisocyanuric acid is a well known product used in laundry, bleaching, and sanitizing applications.

It is known to prepare polychlorisocyanuric acids, for example, dichloroisocyanuric acid or trichloroisocyanuric acid by chlorination of di- or trisodium cyanurate with a chlorinating agent such as chlorine to produce di- or trichloroisocyanuric acid as shown, for example, in U.S. Pat. No. 2,956,056, issued to Christian on Oct. 11, 1960, and U.S. Pat. No. 2,964,525, issued to Robinson on Dec. 13, 1960.

Also known is the reaction of hypochlorous acid with cyanuric acid to produce di- or trichloroisocyanuric acid as disclosed in Sconce, J.S., *Chlorine*, Reinhold, 1962, p. 532 and U.S. Pat. No. 3,712,891, issued to Berkowitz and Messiah on Jan. 23, 1973.

In the above processes, dichloroisocyanuric acid or trichloroisocyanuric acid are prepared separately either by adjusting the ratios of reactants in the processes to give the desired product or by employing separate production facilities.

Where, however, the desired product is primarily trichloroisocyanuric acid, it is inefficient and undesirable to periodically change the ratio of reactants to provide the dichloroisocyanuric acid required. It is expensive and therefore, highly undesirable to employ separate production facilities to produce the required dichlorisocyanuric acid.

The direct hydrolysis of trichloroisocyanuric acid to produce dichloroisocyanuric acid has not been previously disclosed. B. M. Israel found, when determining the hydrolysis constant of organohalogenating agents, including trichloroisocyanuric acid, that the isocyanuric acid system was quite complex due to disporportionation reactions which can occur in addition to the hydrolysis reaction (Diss. Abstracts 22, No. 10, 3424-5, 1962).

There is a need at the present time for a process which permits a plant to efficiently use a single production line to produce trichloroisocyanuric acid, and to readily convert a portion of the trichloroisocyanuric acid to produce dichloroisocyanuric acid.

It is a primary object of the present invention to provide a process for preparing dichloroisocyanuric acid directly from trichloroisocyanuric acid.

This and other objects of the invention will be apparent from the following detailed description of the invention.

Briefly, the foregoing objects are accomplished in a process for producing dichloroisocyanuric acid which comprises admixing finely-divided trichloroisocyanuric acid having a particle size of less than about 60 microns with sufficient water to completely wet the trichloroisocyanuric acid particles. The resulting wet particles of trichloroisocyanuric acid are heated to a temperature above about 90° C., with or without prior separation of any unretained water, whereby hypochlorous acid and uncombined water are vaporized and evolved, and a solid dichloroisocyanuric acid residue is formed.

More in detail, finely divided particles of trichloroisocyanuric acid having a reduced particle size, e.g. less than about 60 microns, and preferably from about 1 to about 50 microns are used as a reactant in the process of this invention. The particle size may be obtained by any suitable means such as a grinding solid trichloroisocyanuric acid in a ball mill, by separating finely-divided particles from granular product, and the like.

The finely divided particles of trichloroisocyanuric acid are admixed with sufficient water to wet the particles. Generally this proportion of water ranges from about 30 percent to about 98 percent by weight of water in the mixture. The characteristics of a suitable mixture varies from a wet cake or paste having a water content of from about 30 to 55 percent by weight, to a flowable slurry, where the water concentration ranges from about 55 to about 98 percent by weight of the mixture. It is preferred to employ sufficient water to completely wet the particles of trichloroisocyanuric acid and form a flowable slurry which contains at least about 55 percent water by weight. Substantially all of the particles are wet with water in the flowable slurry, thereby enhancing the complteness of the reaction during subsequent heating.

During the mixing of the finely-divided particles of trichloroisocyanuric acid with sufficient water to form a slurry, a thick highly viscous slurry of trichloroisocyanuric acid is formed.

Without being limited by theory, it is believed that the viscous slurry forms because of the high water absorption of water on the increase surface area of the finely-divided particles of trichloroisocyanuric acid. A large proportion of water is absorbed in the particles of trichloroisocyanuric acid in the wet cake also.

The amount of water absorbed on the surface of the trichloroisocyanuric acid should be sufficient to prevent the the release of substantial amounts of chlorine-containing gas from the viscous slurry of trichloroisocyanuric acid during mixing.

Mixing of the finely divided trichloroisocyanuric acid particles with water to form the wet cake or viscous slurry proceeds quite rapidly. A mixing time of from about 1 to about 45, and preferably from about 2 to about 30 minutes is generally adequate to effect the formation of the viscous slurry or wet particles, the final consistency depending upon the proportion of water employed.

Suitable mixing temperatures range from about 0° C. to about 50° C. and preferably from about 5° to about 25° C. However, higher temperatures may be used, if desired.

When sufficient water is present in the mixture to form a slurry, the resulting wet particles of trichloroisocyanuric acid may be separated from unretained or unabsorbed water present by any suitable means such as filtering, centrifuging, or evaporation, prior to further processing to form a wet cake of trichloroisocyanuric acid. The water content of the wet cake or paste ranges from about 30 to about 55 and preferably from about 35 to about 50 percent by weight of the mixture.

The resulting wet cake of trichloroisocyanuric acid having water retained therein is then heated to a temperature above about 90° C., preferably from about 90° to about 120°C. to form dichloroisocyanuric acid by the hydrolysis of trichloroisocyanuric acid.

Any heating period necessary to complete the reaction and evaporate water may be employed. Suitable heating periods at the above defined temperatures generally range from about 0.1 to about 10 hours and preferably from about 0.5 to about 5 hours. Any suitable heating period may be employed, and it will vary with the temperature, quantity of solid and quantity of water present in the wet cake.

The hydrolysis reaction is believed to proceed according to the following equation:

$$Cl_3C_3N_3O_3 + H_2O \rightarrow HCl_2C_3N_3O_3 + HOCl$$

Only 1 gram-mol of water per gram-mol of trichloroisocyanuric acid is theoretically required to effect hydrolysis in accordance with the above equation. However, little or no reaction occurs with such a small proportion of water. In carrying out the process of this invention, water in excess of this amount, i.e., at least enough water to form wet cake or paste as described above is required, in addition to the use of finely divided particles of trichloroisocyanuric acid.

During the heating of the wet particles of trichloroisocyanuric acid, hypochlorous acid is formed, vaporized and evolved. Also vaporized and evolved during the heating of the particles of trichloroisocyanuric acid is any unreacted water present such as water retained or absorbed on the surface of the particles, but which does not react during heating.

The chlorine components of the vapors may be recovered, for example, by scrubbing the vapors in an aqueous solution of a base such as $NaOH$ or $Na_2CO_3$ to form sodium hypochlorite.

Dichloroisocyanuric acid produced by the process of this invention, is a solid granular product free of inorganic salt impurities and generally free of dusty fines.

In another embodiment of the invention, mechanical means of reducing the particle size of trichloroisocyanuric acid may be avoided by mixing commercial grade granular trichloroisocyanuric acid or other granular trichloroisocyanuric acid with an aqueous solution containing from about 10 to about 26, and preferably from about 15 to about 26 percent by weight of an alkali metal chloride. The proportion of this solution is sufficient to provide a slurry containing at least about 55 percent and preferably from about 60 percent to about 95 percent by weight of the aqueous solution in the resulting slurry.

In addition, the viscosity of the slurry should be low enough to permit mixing of the granular trichloroisocyanuric acid with the aqueous alkali metal chloride solution to form a slurry which is pumpable and can be subjected to filtration or other similar solids-liquids separation technique. Thus, when a 15 percent aqueous solution of alkali metal chloride is used, granular trichloroisocyanuric acid in a proportion of up to about 0.8 parts per part by weight of the aqueous salt solution can be added and still obtain a pumpable slurry. However, when a 26 percent aqueous solution of alkali metal chloride is used, the proportion of granular trichloroisocyanuric acid should not exceed about 0.6 parts per part by weight of aqueous salt solution.

During the mixing of the aqueous alkali metal chloride solution, the temperature is maintained in the range from about $-21°C$. to about $40°C$., and preferably from about $0°$ to about $15°C$. The trichloroisocyanuric acid is maintained in contact with the aqueous solution of the alkali metal chloride until a viscous slurry of trichloroioscyanuric acid is formed.

Any suitable alkali metal chloride such as sodium chloride, potassium chloride or lithium chloride or mixtures thereof, may be be used to form the above described aqueous solution of alkali metal chloride.

During the admixing of trichloroisocyanuric acid with the aqueous solution of alkali metal chloride, a crystalline transformation occurs. When the solution contains about 15 percent by weight of alkali metal chloride, the coarse crystals of irregular rectangular shape found in commercial grade trichloroisocyanuric acid are converted to lath-shaped needles having a thickness, for example, of from about 0.5 to about 10 microns. Without being limited by theory, it is believed that the crystalline form of lath-type needles having a high surface to volume ratio, provides the basis for the retention of aqueous solution by adsorption to form the viscous slurry of trichloroisocyanuric acid. When the solution contains about 26 percent by weight of alkali metal chloride the coarse crystals appear to break down to small rounded particles ranging from about 1 to about 20 microns. An aqueous solution of about 20 percent alkali metal chloride appears to change the coarse crystals to a mixture of lath-shape crystals and small rounded crystals.

Agitation of the mixture is desirable during the period in which the viscous slurry of trichloroisocyanuric acid forms to assure intimate contact between trichloroisocyanuric acid and the aqueous solution of the alkali metal chloride.

Any suitable mixing time of the alkali metal chloride slurry which permits the crystalline transformation to occur may be used, for example, from about 0.2 to about 3 hours, and preferably from about 0.3 to about 1 hour.

After formation of the viscous slurry of trichloroisocyanuric acid in the alkali metal chloride solution, the slurry is filtered, centrifuged, or otherwise processed to form a wet cake or paste containing from about 30 to about 55 percent and preferably from about 35 to about 50 percent by weight of the alkali metal chloride solution in the resulting wet cake. If the concentration of alkali metal chloride in the resulting cake is less than about 0.1 mol of alkali metal chloride per mol of trichloroisocyanuric acid, the wet cake of trichloroisocyanuric acid may be heated with or without further processing to remove any uncombined or unretained aqueous solution present. The wet cake may be heated to a temperature above about $90°C$., and preferably in the range from about $90°C$. to about $120°C$., to vaporize and evolve hypochlorous acid and water in the uncombined aqueous solution. However, during heating, any alkali metal chloride present reacts with a portion of the trichloroisocyanuric acid to form an alkali metal dichloroisocyanurate. The product thus obtained is solid dichloroisocyanuric acid containing up to about 10 percent by weight of alkali metal dichloroisocyanurate as an impurity. Thus, in order to obtain a dichloroisocyanuric acid product of higher purity, it is preferred to wash the wet cake of trichloroisocyanuric acid containing alkali metal chloride solution with cold water, for example, to remove substantially all of the alkali metal chloride, i.e., to less than about 0.1 and preferably about 0.05 mol of alkali metal chloride per mol of trichloroisocyanuric acid, before heating the wet cake to form dichloroisocyanuric acid.

The cold water generally has a temperature ranging from about $0°C$. to about $25°C$., and preferably from $0°C$. to about $15°C$. After washing, the wash liquid is separated by filtering or centrifuging to form a wet cake containing water in the range from about 30 to about 55 and preferably from about 35 to about 50 percent by weight. The resulting washed wet cake is then heated as described above to form solid dichloroisocyanuric acid.

It is preferred to add a small amount of chlorine during the mixing of the trichloroisocyanuric acid with the aqueous solution of alkali metal chloride to suppress the reaction of salt with trichloroisocyanuric acid. This amount of chlorine added is less than 1 percent by weight of the aqueous solution, for example, from about 0.1 to about 0.5 percent by weight of the aqueous solution.

In a further embodiment of the invention, dichloroisocyanuric acid may be prepared from aqueous by-product solutions obtained in the production of trichloroisocyanuric acid. These solutions contain varying amounts of dissolved trichloroisocyanuric acid, alkali metal chloride, and dissolved chlorine. The by-product solutions usually have concentrations of trichloroisocyanuric acid of from about 0.01 to about 2 percent by weight, alkali metal chloride concentrations of from about 3 to about 25 percent by weight of alkali metal chloride, and from about 73 to about 94 percent by weight of water. The aqueous by-product solutions are obtained, for example, in a process for preparing trichloroisocyanuric acid in which cyanuric acid is reacted with sodium hydroxide to form trisodium cyanurate, which is then chlorinated by the addition of chlorine gas to produce a slurry containing trichloroisocyanuric acid. The slurry is filtered to recover the trichloroisocyanuric acid and a by-product solution containing varying concentrations of dissolved trichlonoisocyanuric acid remains. U.S. Pat. No. 2,964,525, issued on Dec. 13, 1960 to Robinson; U.S. Pat. No. 2,975,178, issued on Mar. 14, 1961 to Huegel et al; U.S. Pat. No. 3,189,609, issued on June 15, 1965 to Becanne et al, and U.S. Pat. No. 3,545,033, issued on Oct. 13, 1970 to Kagawa et al are illustrations of processes for preparing by-product trichloroisocyanuric acid solutions.

To this by-product solution, solid, commercial granular trichloroisocyanuric acid or other granular form and, if desired, alkali metal chloride are added in an amount sufficient to bring the reactants to within the above defined range and from a viscous slurry of trichloroisocyanuric acid as described above with respect to the slurry of trichloroisocyanuric acid and aqueous solution of alkali metal chloride. The viscous slurry is treated as described above to produce dichloroisocyanuric acid.

The following examples are presented to further illustrate the invention without any intention of being limited thereby. All parts and percentages are by weight unless otherwise specified. The abbreviation "Cl₃CA" represent "trichloroisocyanuric acid" in the following examples.

EXAMPLE 1

Approximately 100g of trichloroisocyanuric acid were ground in a ball mill for several hours to obtain a material which was examined under a microscope and found to have a particle size distribution of from about 1 to about 44 microns. A portion of the ground trichloroisocyanuric acid, 44.5g, was added to 455 mls. of water and stirred. After a few minutes, a viscous slurry formed which was filtered and heated in a force draft oven at 100° C. for several hours. The resulting solid was identified by infrared analysis as dichloroisocyanuric acid. It was obtained in a yield of 30g (80 percent of theory) and had an available chlorine content of 68.3 percent.

For purposes of comparison, a granular trichloroisocyanuric acid in which 43 percent of the granules were larger than 200 mesh (74 microns and only 22 percent by weight of the particles were less than 44 microns, 325 mesh) was heated in the presence of water in the same manner as the fine particles above. No detectable reaction between the water and trichloroisocyanuric acid was observed and no dichloroisocyanuric acid was detected.

EXAMPLE 2

Trichloroisocyanuric acid (89.0g) was added to 911g of an aqueous solution containing 15 percent by weight of sodium chloride and 0.2 percent by weight of dissolved chlorine. The reaction mixture was stirred over a 30 minute period while maintaining the temperature at 10° C. during which time the viscosity of the slurry increased significantly. The slurry was filtered and washed with 75 ml. of ice water. The washed filter cake was heated for 1 hour at 100° C. to give 62.7g (83 percent of theory) of a dry free-flowing granular white solid product having an available chlorine content of 69.6 percent (theory 71.7 percent). The product was identified as dichloroisocyanuric acid by infrared analysis.

EXAMPLE 3

A slurry of granular Cl₃CA (44.5g, 0.19 mol) in 455g of a solution containing 20 percent by weight of NaCl and saturated with chlorine was stirred at 10° C. for 1 hour. During the course of this period a marked increase in the viscosity of the slurry occurred. A microscopic examination of a sample of the solids from the slurry revealed that the original relatively large irregularly shaped Cl₃CA crystals were transformed to small needle-shaped crystals of 0.5 to 10 microns in width. Filtration of the slurry through a coarse frit followed by washing and heating in an oven at 100° C. for several hours gave dichloroisocyanuric acid (29.7g, 0.15 mol) with an available chlorine analysis of 72.7 percent.

What is claimed is:

1. A process for preparing dichloroisocyanuric acid which comprises:
   a. admixing finely-divided trichloroisocyanuric acid particles having a particle size of less than about 60 microns with water to form a mixture containing from about 30 to about 98 percent by weight of water,
   b. maintaining said finely divided trichloroisocyanuric acid particles in contact with said water until said particles of trichloroisocyanuric acid are completely wet,
   c. heating said wet particles to a temperature above about 90° C., whereby hypochlorous acid and water are vaporized and evolved, and a solid dichloroisocyanuric acid residue is formed.

2. The process of claim 1 in which said particle size of said finely divided trichloroisocyanuric acid is from about 1 to about 50 microns.

3. The process of claim 1 in which said wet particles of trichloroisocyanuric acid are in the form of a wet cake containing water in a proportion from about 30 to about 55 percent by weight of said wet cake prior to said heating.

4. The process of claim 3 in which said wet cake is heated to a temperature of from about 90° to about 120° C. for a period of about 0.5 to about 5 hours.

5. The process of claim 4 in which said finely-divided trichloroisocyanuric acid particles are maintained in contact with said water for from about 1 to about 45 minutes at a mixing temperature in the range from about 0° about 50° C.

6. The process of claim 5 in which said mixture contains from about 55 to about 98 percent by weight of water, and excess water is separated after mixing to form a wet cake containing from about 30 to about 50 percent water by weight.

7. The process of claim 6 in which said mixing temperature is in the range from about 5° C. to about 25° C.

8. The process for preparing dichloroisocyanuric acid which comprises:
   a. admixing granular trichloroisocyanuric acid with an aqueous solution containing from about 10 to about 26 percent by weight of an alkali metal chloride to form a slurry containing from about 30 to about 95 percent by weight of said aqueous solution,
   b. maintaining said trichloroisocyanuric acid in contact with said aqueous solution at a temperature of about −21° C. to about 40° C. until a viscous slurry of trichloroisocyanuric acid particles is formed,
   c. separating said aqueous solution from said particles until the proportion of alkali metal chloride solution retained on said particles is equivalent to a molar ratio of said alkali metal chloride to said trichloroisocyanuric acid of less than about 0.1:1, and
   d. heating said particles depleted in alkali metal chloride solution to a temperature above about 90° C., whereby hypochlorous acid and water are vaporized and evolved and a solid dichloroisocyanuric acid residue is formed.

9. The process of claim 8 in which said slurry is admixed at a temperature in the range from about 0° C. to about 15° C.

10. The process of claim 9 in which a sufficient proportion of said aqueous solution is separated from said particles to form a wet cake of said particles containing from about 30 to about 55 percent by weight of said aqueous solution, and the resulting wet cake is washed with cold water to remove said aqueous solution from said particles.

11. The process of claim 10 wherein the resulting washed wet cake contains from about 30 to about 55 percent by weight of water and the proportion of alkali metal chloride remaining in said wet cake is less than about 0.05 mol of alkali metal chloride per mol of trichloroisocyanuric acid.

12. The process of claim 11 wherein said alkali metal chloride is sodium chloride.

13. The process of claim 11 in which said aqueous alkali metal chloride solution contains from about 15 to about 26 percent by weight of said alkali metal chloride.

14. The process of claim 13 in which said alkali metal chloride is sodium chloride.

15. The process of claim 10 in which said aqueous solution of an alkali metal chloride is a by-product solution obtained in the production of trichloroisocyanuric acid containing from about 0.01 to about 2 percent by weight of trichloroisocyanuric acid, from about 3 to about 25 percent by weight of said alkali metal chloride and from about 73 to about 94 percent by weight of water.

* * * * *